(12) United States Patent
Wiggs

(10) Patent No.: US 7,146,823 B1
(45) Date of Patent: Dec. 12, 2006

(54) HORIZONTAL AND VERTICAL DIRECT EXCHANGE HEATING/COOLING SYSTEM SUB-SURFACE TUBING INSTALLATION MEANS

(75) Inventor: B. Ryland Wiggs, Franklin, TN (US)

(73) Assignee: Earth To Air Systems, LLC, Franklin, TN (US)

( * ) Notice: Subject to any disclaimer, the term of this patent is extended or adjusted under 35 U.S.C. 154(b) by 33 days.

(21) Appl. No.: 10/874,018

(22) Filed: Jun. 22, 2004

(51) Int. Cl.
F25D 23/12 (2006.01)

(52) U.S. Cl. ............................................. 62/260
(58) Field of Classification Search ........... 62/238.7, 62/260, 330, 331; 165/45
See application file for complete search history.

(56) References Cited

U.S. PATENT DOCUMENTS

| | | | |
|---|---|---|---|
| 2,503,456 A | 4/1950 | Smith | 62/115 |
| 3,452,813 A | 7/1969 | Watkins et al. | 165/120 |
| 4,010,731 A | 3/1977 | Harrison | 126/271 |
| 4,094,356 A | 6/1978 | Ash et al. | 165/39 |
| 4,224,805 A | 9/1980 | Rothwell | 62/260 |
| 4,257,239 A | 3/1981 | Partin et al. | 62/238 |
| 4,286,651 A * | 9/1981 | Steiger et al. | 165/45 |
| 4,290,266 A | 9/1981 | Twite et al. | 60/641.2 |
| 4,325,228 A * | 4/1982 | Wolf | 62/260 |
| 4,375,831 A * | 3/1983 | Downing, Jr. | 165/48.1 |
| 4,378,787 A | 4/1983 | Fleischmann | 126/430 |
| 4,392,531 A * | 7/1983 | Ippolito | 166/278 |
| 4,538,673 A * | 9/1985 | Partin et al. | 165/45 |
| 4,544,021 A | 10/1985 | Barrett | 165/45 |
| 4,715,429 A | 12/1987 | Mogensen | 165/45 |
| 4,741,388 A | 5/1988 | Kuroiwa | 165/45 |
| 4,867,229 A | 9/1989 | Mogensen | 165/1 |
| 4,993,483 A | 2/1991 | Harris | 165/45 |
| 5,025,634 A | 6/1991 | Dressler | 62/79 |
| 5,025,641 A * | 6/1991 | Broadhurst | 62/347 |
| 5,038,580 A | 8/1991 | Hart | 62/324.6 |
| 5,136,855 A * | 8/1992 | Lenarduzzi | 62/129 |
| 5,224,357 A | 7/1993 | Galiyano et al. | 62/260 |
| 5,277,032 A * | 1/1994 | See et al. | 62/125 |
| 5,313,804 A | 5/1994 | Kaye | 62/160 |
| 5,461,876 A | 10/1995 | Dressler | 62/160 |
| 5,477,914 A | 12/1995 | Rawlings | 165/45 |
| 5,533,355 A | 7/1996 | Rawlings | 62/260 |
| 5,560,220 A | 10/1996 | Cochran | 62/260 |
| 5,561,985 A | 10/1996 | Cochran | 62/260 |
| 5,564,282 A | 10/1996 | Kaye | 62/160 |
| 5,623,986 A | 4/1997 | Wiggs | 165/45 |

(Continued)

FOREIGN PATENT DOCUMENTS

WO   WO 95/30863   * 11/1995

Primary Examiner—Mohammad M. Ali
(74) Attorney, Agent, or Firm—Waddey & Patterson, P.C.; Phillip E. Walker

(57) ABSTRACT

A sub-surface geothermal direct exchange sub-surface tubing installation means, comprising situating certain specified tubing sizes for certain specified horizontal distances and for certain specified depths within each of a horizontally oriented trench and a vertically oriented well/borehole, as well as comprising a tubing installation means to increase the efficiency of any direct expansion system by means of adding at least one additional liquid refrigerant transport line segment within at least one of a well/borehole and a trench, together with a certain amount of insulation at specified locations, as well as comprising a means of surrounding horizontally oriented sub-surface refrigerant transport heat exchange tubing with a protective solid grout, with the operative system refrigerant being comprised of a refrigerant with system operating pressures at least 10% greater than R-22.

17 Claims, 3 Drawing Sheets

U.S. PATENT DOCUMENTS

| | | | |
|---|---|---|---|
| 5,671,608 A | 9/1997 | Wiggs et al. | 62/260 |
| 5,706,888 A | 1/1998 | Ambs et al. | 165/155 |
| 5,738,164 A | 4/1998 | Hildebrand | 165/45 |
| 5,758,514 A | 6/1998 | Genung et al. | 62/471 |
| 5,771,700 A | 6/1998 | Cochran | 62/117 |
| 5,816,314 A | 10/1998 | Wiggs et al. | 165/45 |
| 5,875,644 A | 3/1999 | Ambs et al. | 62/324.6 |
| 5,937,665 A | 8/1999 | Kiessel et al. | 62/260 |
| 5,937,934 A | 8/1999 | Hildebrand | 165/45 |
| 5,941,238 A * | 8/1999 | Tracy | 126/641 |
| 5,946,928 A | 9/1999 | Wiggs | 62/260 |
| 6,041,862 A * | 3/2000 | Amerman | 166/290 |
| 6,138,744 A | 10/2000 | Coffee | 165/45 |
| 6,212,896 B1 | 4/2001 | Genung | 62/260 |
| 6,227,003 B1 * | 5/2001 | Smolinsky | 62/324.1 |
| 6,251,179 B1 * | 6/2001 | Allan | 106/719 |
| 6,276,438 B1 | 8/2001 | Amerman et al. | 165/45 |
| 6,450,247 B1 | 9/2002 | Raff | 165/45 |
| 6,615,601 B1 | 9/2003 | Wiggs | 62/235.1 |
| 6,751,974 B1 | 6/2004 | Wiggs | 62/260 |
| 2004/0108096 A1 * | 6/2004 | Janssen | 165/11.1 |

* cited by examiner

HORIZONTAL AND VERTICAL DIRECT EXCHANGE HEATING/COOLING SYSTEM SUB-SURFACE TUBING INSTALLATION MEANS

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Be it known that I, B. Ryland Wiggs, a citizen of the United States, residing at 425 Sims Lane, Franklin, Tenn. 37069, have invented a new and useful "Horizontal And Vertical Direct Exchange Heating/Cooling System Sub-Surface Tubing Installation Means."

BACKGROUND OF THE INVENTION

The present invention relates to an improved sub-surface geothermal direct exchange (also commonly referred to as "direct expansion") tubing installation means, comprising situating certain sized refrigerant transport sub-surface tubing within each of a horizontally oriented trench and a vertically oriented well/borehole, so as to provide a highly efficient sub-surface heat transfer means, when sufficient land surface area is available, at a lower cost than with a primarily vertically oriented tubing installation means. Further, the present invention relates to a means to increase the efficiency of any direct exchange system design by means of adding an additional liquid refrigerant transport line segment in at least one of a vertically oriented well/borehole and a horizontally oriented trench and/or pit, as well as to a means of improving the efficiency and durability of horizontally oriented sub-surface refrigerant transport heat exchange tubing by utilizing a refrigerant with a higher operating pressure than R-22 and by surrounding the refrigerant transport tubing with a protective solid grout.

Geothermal ground source/water source heat exchange systems typically utilize fluid-filled closed loops of tubing buried in the ground, or submerged in a body of water, so as to either absorb heat from, or to reject heat into, the naturally occurring geothermal mass and/or water surrounding the buried or submerged fluid transport tubing. The tubing loop is extended to the surface and is then used to circulate one of the naturally warmed and naturally cooled fluid to an interior air heat exchange means.

Common and older design geothermal water-source heating/cooling systems typically circulate, via a water pump, a fluid comprised of water, or water with anti-freeze, in plastic (typically polyethylene) underground geothermal tubing so as to transfer heat to or from the ground in a first heat exchange step. Via a second heat exchange step, a refrigerant is utilized to transfer heat to or from the water. Finally, via a third heat exchange step, an electric fan is utilized to transfer heat to or from the refrigerant to heat or cool interior air space.

Newer design Direct eXchange/Direct eXpansion ("DX") geothermal heat exchange systems, where the refrigerant fluid transport lines are placed directly in the sub-surface ground and/or water, typically circulate a refrigerant fluid, such as R-22 or the like, in sub-surface refrigerant lines, typically comprised of copper tubing, to transfer heat to or from the sub-surface elements via a first heat exchange step. DX systems only require a second heat exchange step to transfer heat to or from the interior air space, typically by means of an electric fan. Consequently, DX systems are generally more efficient than water-source systems because of less heat exchange steps and because no water pump energy expenditure is required. Further, since copper is a better heat conductor than most plastics, and since the refrigerant fluid circulating within the copper tubing of a DX system generally has a greater temperature differential with the surrounding ground than the water circulating within the plastic tubing of a water-source system, generally, less excavation and drilling is required, and installation costs are lower, with a DX system than with a water-source system.

While most in-ground/in-water heat exchange designs are feasible, various improvements have been developed intended to enhance overall system operational efficiencies. Several such design improvements, particularly in direct expansion/direct exchange geothermal heat pump systems, are taught in U.S. Pat. No. 5,623,986 to Wiggs; in U.S. Pat. No. 5,816,314 to Wiggs, et al.; in U.S. Pat. No. 5,946,928 to Wiggs; and in U.S. Pat. No. 6,615,601 B1 to Wiggs, the disclosures of which are incorporated herein by reference. Such disclosures encompass both horizontally and vertically oriented sub-surface heat geothermal heat exchange means.

Historically, DX systems, with principally horizontally oriented geothermal heat exchange means, utilized an array of multiple smaller diameter tubing, typically comprised of at least one of $\frac{1}{8}$", $\frac{1}{4}$", and $\frac{3}{8}$" tubing in a horizontally inclined manner, all connecting to a principal single vapor refrigerant transport line at one end and to a principal single liquid refrigerant transport line at the other end. Also, horizontally oriented designs have been tested by Wiggs utilizing at least one long heat exchange transport tube within a long horizontally oriented near-surface trench. Typically, horizontally oriented DX systems are the least expensive to install because excavation can be accomplished with only a backhoe and/or a front-end loader.

Also historically, DX systems, with principally vertically oriented geothermal heat exchange means, utilized at least one well/borehole within which to insert a closed loop of refrigerant transport heat exchange tubing. Generally, because of extreme and fluctuating hot/cold atmospheric effects upon ground in close proximity to the surface, DX systems within a well/borehole have historically been more efficient, even though they have typically been the most expensive to install because of well-drilling costs.

Since combining the less expensive horizontally oriented heat exchange tubing with the more efficient vertically oriented heat exchange tubing would provide a more affordable system than a solely vertical installation and a more efficient system than a solely horizontal installation, an appropriate combination design would be preferable for many applications. Also, such a combination design, that provided very high operational efficiencies, would be preferable so as to provide DX system availability to those with limited financial resources and with some, but limited (not enough for a solely horizontal design), available land surface area.

Consequently, a means to provide a highly efficient, and reasonably priced, manner in which to install a combined horizontally and vertically oriented geothermal DX heat exchange fluid transport tubing system that achieved high operational efficiencies would be preferable. Further, a means to supplement and improve the efficiency levels of conventional, and new, horizontally oriented DX system sub-surface heat transfer tubing system designs would also be preferable. The present invention provides a solution to these preferable objectives, as hereinafter more fully described.

SUMMARY OF THE INVENTION

It is an object of the present invention to enhance and improve the efficiency of a horizontally oriented DX geothermal heat exchange system and to enhance and improve the cost effectiveness of installing a vertically oriented DX geothermal heat exchange system by means of appropriately combining horizontally and vertically oriented sub-surface heat exchange fluid transport tubing. Additionally, it is an object of the present invention to increase the efficiency of any DX system sub-surface refrigerant transport tubing geothermal heat exchange design by means of adding an additional liquid refrigerant transport line segment in at least one of a vertically oriented well/borehole and a horizontally oriented trench. Further, it is an object of the present invention to additionally improve the efficiency of horizontally oriented sub-surface refrigerant transport heat exchange tubing by means of utilizing an operational refrigerant pressure over and above that of the conventional R-22 refrigerant, and to improve the durability (resistance to sub-surface corrosive elements) of horizontally oriented sub-surface refrigerant transport heat exchange tubing by surrounding same with a protective solid grout.

Such an improved sub-surface geothermal DX system tubing installation means is accomplished by means of providing certain specified tubing sizes for certain specified depths and/or for certain specified horizontal distances, together with a certain amount of insulation at specified locations. Further, efficiencies in such a system design are enhanced by means of the utilization of a refrigerant with operating pressures at least ten percent higher than those of an R-22 refrigerant.

Testing has indicated that, in order to obtain very high operational efficiencies in vertically oriented well/borehole type tubing installation designs and/or in horizontally oriented trench and/or pit and/or excavated area tubing installation designs, and in any variation of combinations thereof, with system operational efficiencies that approximately rival those of a deep well/borehole installation, but at a reduced installation cost due to less well/borehole drilling requirements, one must take several interrelated factors into account, all of which call for unique system design criteria.

For example, in a vertical and horizontal DX system combination sub-surface refrigerant tubing geothermal heat transfer design, the well/borehole, must be placed at an optimum location, both the horizontally oriented and the vertically oriented geothermal heat transfer lines must be correctly sized, an appropriate amount of insulation must surround the vertically oriented line at an optimum location, and a refrigerant with at least a ten percent greater operational pressure than R-22 should preferably be utilized as the heat transfer fluid circulating within the refrigerant transport tubing.

In a DX system application, the sub-surface refrigerant transport tubing is designed to transport a cold/cool fluid in the winter to absorb heat from the ground, and a hot/warm fluid in the summer to dissipate heat into the ground, as is well understood by those skilled in the art. Generally, to accomplish such heat transfer, a portion of the sub-surface refrigerant transport tubing carries a liquid refrigerant fluid and another portion carries a vapor refrigerant fluid, as is well understood by those skilled in the art.

Preferably, although multiple sub-surface horizontally oriented refrigerant transport heat exchange tubes may be utilized, in at least one of a trench, a pit, and an excavated area, in order to keep installation costs and time to a minimum, only one horizontally oriented tube/line should be utilized. Testing has shown, however, that the use of too large a diameter single vapor transport line in the vapor transport segment of a horizontally oriented line will decrease system operational efficiencies, particularly in the cooling mode when the ground is the condenser. Such a decrease in operational efficiencies is caused by a refrigerant "surfing" effect. A refrigerant surfing effect is created by the hot/warm refrigerant vapor, that has not yet been condensed, filling the available space over the top of the cooler condensed liquid only in the bottom portion of a horizontally oriented vapor transport line. Thus, in the cooling mode of system operation, as the cooled liquid refrigerant is being returned, ultimately to the interior heat exchange means (typically an interior air handler, as is well understood by those skilled in the art), the cooled liquid refrigerant mixes with the still hot/warm vapor refrigerant that has traveled across, or surfed across, the top of the condensed liquid at the bottom of the line/tube, thereby increasing the temperature of the returning refrigerant and decreasing the system's ability to absorb and remove unwanted heat from the interior air (decreasing the system's operational efficiency).

To prevent such an inefficient surfing effect, primarily in the cooling mode of system operation, two measures should preferably be taken. First, the single horizontally oriented refrigerant transport line/tube should be comprised of periodically decreasing sized segments, so as to restrict vapor surfing along the entire condensation path in the cooling mode. Second, a vertically oriented portion of the final and smallest diameter liquid transport line segment, in the cooling mode, should be situated within a vertically oriented well/borehole in a U-bend, or looped, fashion, so as to expose any remaining refrigerant vapor to the coolest possible, and most stable, sub-surface temperatures existing in the deepest line/tube segment. Additionally, at least 10%, and preferably 25%, of the portion of the liquid refrigerant fluid transport line exiting the well/borehole (25% of the exiting half portion, in the cooling mode, of the looped refrigerant transport line from the bottom of the well to the top of the well) should be insulated so as to prevent a "short-circuiting" effect. A short-circuiting effect is caused by the cooled refrigerant, within the refrigerant transport tubing exiting the well/borehole, coming into close contact with the hot/warm refrigerant, within the refrigerant transport tubing, entering the well/borehole. Since most of the extreme heat in the vapor refrigerant will have been removed by the horizontally oriented refrigerant transport line by the time the mostly liquid form refrigerant enters the well/borehole, it is not necessary to fully or mostly insulate the return liquid line out of the well/borehole, as it would be preferable to do in a solely vertically oriented system application. This design ability both reduces insulation expense and provides more refrigerant transport line/tube surface area exposure within the coldest portion of the geothermal system.

In such a DX system design, in the heating mode, when the refrigerant is flowing in a reverse direction, through the sub-surface refrigerant transport tubing, to that of in the cooling mode, as is well understood by those skilled in the art, the initial and primary heat gain will be in the well/borehole, which is typically the warmest and most stable temperature area. With the primary heat transfer occurring in the warmest segment of the sub-surface tubing, the necessary heat transfer load is mitigated on the remaining near-surface horizontal segment of the geothermal system which is subject to some duress by cold atmospheric conditions.

Further, such a DX system design eliminates the necessity and expense to totally parallel the vapor refrigerant transport line with a liquid refrigerant transport line, as is required in a fully vertically oriented system, thereby adding to the cost savings.

As has already been tested and/or taught by Wiggs, near-surface horizontally oriented refrigerant transport lines should be surrounded by a heat conductive fill material, such as a powdered limestone and/or a high silica content sand with a soaker hose over the top so as to enable the fill material to be moistened with water as necessary, and vertically oriented refrigerant transport lines should preferably be surrounded by a heat conductive fill material, such as a heat conductive grout, such as Grout 111. As mentioned, and as has already been tested and/or taught by Wiggs, near-surface horizontally oriented refrigerant transport lines should be equipped with a soaker hose (a water conductive hose with small holes periodically drilled in its wall so as to permit water to leak into the surrounding fill material) over the top of the heat conductive fill material surrounding the refrigerant transport tubing so as to be able to assist in adding water in the cooling mode (in the event too much near-surface moisture in the surrounding ground has been driven away by the heat produced during system operation in the cooling mode) by means of channeling condensate drain water and/or water from another source into the soaker hose.

However, recent heat conductivity tests have shown that dry powdered limestone and dry sand only have heat conductivity rates near 0.2 BTUs/Ft.Hr. degrees F., whereas a Grout 111 mixture, which cures into a solid composition comprised of certain established quantities (with such quantities well known to those skilled in the art) of cement, water, sand, superplasticizer, and bentonite, provides a heat conductivity rate about 500% better. Thus, rather than utilizing a non-solid powdered limestone and/or sand fill material to surround horizontally oriented DX system sub-surface refrigerant heat transfer tubing, an improved and preferred means would be to utilize a solid heat conductive fill material, such as a Grout 111 mixture, to surround such horizontally oriented tubing, because a solid surrounding material generally has a significantly better heat conductivity rate than a non-solid surrounding material. While the cost to install Grout 111 will be greater than the cost to install a powdered limestone and/or sand material, the efficiency gain will typically justify the extra cost.

Further, the necessity to utilize a soaker hose over such horizontally oriented sub-surface refrigerant transport tubing surrounded by Grout 111 will be one of significantly mitigated and eliminated. In such a horizontally oriented, near-surface, tubing application, in conjunction with Grout 111 or the like, the sub-surface refrigerant transport tubing utilized for heat transfer purposes should preferably be surrounded by at least ½ inch of a solid grout, such as Grout 111, so as to both increase good conductivity surface area within dry or loose soils with poor heat transfer ability and so as to protect the refrigerant transport tubing, which is typically copper, from potentially corrosive sub-surface soil and/or water conditions. Since Grout 111 provides a protective barrier against sub-surface conditions corrosive to copper, the need for conventional cathodic protection of the copper tubing can thereby be eliminated in a DX system design.

Regarding the preferred type of refrigerant for use in such a combined trench/well system (while a trench is typically preferred for single line horizontally oriented applications, the term trench may be used interchangeably with a pit and/or with an excavated area for the basic purposes of providing an appropriate below-ground area within which to install at least one horizontally oriented sub-surface refrigerant transport tube/line), while the commonly used R-22 refrigerant may suffice, particularly when well/borehole depths are 100 feet or less, testing has demonstrated that higher operational efficiencies can be obtained via the use of a refrigerant with at least 10% greater system operation pressures than R-22, such as, for example, a refrigerant that preferably has about a 40% greater system operation pressure, such as an R-410A refrigerant or the like. Typical R-22 refrigerant system operational pressures are well understood by those skilled in the art. While, in Deep Well Direct eXchange ("DWDX") system applications (applications with well/boreholes in excess of 100 feet deep, and that often are in the 300 foot deep range), refrigerants with system operational pressures greater than 10% are preferred, since the depth of the well/borehole in a horizontal and vertical combination (trench/well) system will typically not exceed 170 feet, at least a 10% refrigerant pressure increase will generally always suffice, although the use of a refrigerant with a higher operational pressure, such as a 40% higher operational pressure, such as an R-410A or the like refrigerant, would be preferred. Similarly, testing has shown that the use of at least a 10% greater system operational refrigerant pressure than that afforded by R-22 (which is well understood by those skilled in the art) will increase the operational efficiency levels of even DX systems with fully horizontally oriented sub-surface refrigerant transport heat exchange tubing designs, although refrigerants with a 40% higher operational pressure than that of R-22 are preferred, such as an R-410A or the like refrigerant.

As previously stated, the single horizontally oriented refrigerant transport line/tube should be comprised of periodically decreasing size segments so as to restrict vapor surfing along the entire condensation path in the cooling mode. Such decreasing size line segments must be comprised of at least two line segment sizes at a minimum, so as to provide a total horizontally oriented, un-insulated, line/tube segment combined length of at least 100 feet per ton of system maximum heating/cooling design capacity (system design capacity is calculated via ACCA Manuel J, or via other similar calculation procedures, as is well understood by those skilled in the art).

Specifically, however, testing has shown that a preferable means of such a design would be comprised of utilizing at least three horizontally oriented refrigerant transport line/tube segments, with each segment being of an equal length, preferably so as to provide a total horizontally oriented, un-insulated, line/tube segment combined length of at least 100 feet per ton of system design capacity, and being comprised of refrigerant grade copper tubing that decreases by a respective one-eighth inch outside diameter ("O.D.") size per segment, with the final (in the cooling mode) segment tubing size additionally comprising the liquid transport line/tubing size that is situated within a vertically oriented well/borehole, prior to returning to the interior DX system equipment. The depth of the final looped segment within the well/borehole should extend to at least 25% of the total combined lengths of the three horizontally oriented segments, with a depth of 33.3% of the total combined lengths of all the horizontally oriented segments being preferred. Such a minimum 25%, and preferable 33.3%, depth correlates, respectively, to 25% and 33.3% of the system's maximum tonnage design capacity (as is well understood by those skilled in the art) times 100 feet per ton. Interior DX system equipment is well understood by those skilled in the art, has been taught and disclosed by Wiggs, and is, therefore, neither shown nor described herein.

As a specific example, testing has shown that a preferred system design for a 1 ton up to, but not including, a 3 ton heating/cooling system design capacity calls for a ⅜ inch O.D. refrigerant grade copper liquid refrigerant transport line. (System design capacities in tons, where one ton equals 12,000 BTUs, are well understood by those skilled in the art.) Thus, in such a system design, the first un-insulated portion/segment of the geothermal heat exchange, sub-surface, horizontally oriented, hot vapor refrigerant transport line/tube, with the refrigerant vapor being transported having exited the system's compressor in the cooling mode of operation, should be comprised of a ⅝ inch O.D. line, with the next and second un-insulated horizontally oriented segment being comprised of a ½ (⁴⁄₈) inch O.D. line, with the next and third horizontally oriented un-insulated segment being comprised of a ⅜ inch O.D. line, and with the last and fourth segment to be installed within the vertically oriented well/borehole being also comprised of a ⅜ inch O.D. line.

As a further specific example, testing has shown that a preferred system design for a 3 ton up to, and including, a 5 ton heating/cooling system design capacity calls for a ½ inch O.D. refrigerant grade copper liquid refrigerant transport line. Thus, in such a system design, the first un-insulated portion of the geothermal heat exchange, sub-surface, horizontally oriented, hot vapor refrigerant transport line/tube, with the refrigerant vapor being transported having exited the system's compressor in the cooling mode of operation, should be comprised of a ¾ (⁶⁄₈) inch O.D. line, with the next and second un-insulated horizontally oriented segment being comprised of a ⅝ inch O.D. line, with the next and third un-insulated horizontally oriented segment being comprised of a ½ inch O.D. line, and with the last and fourth mostly un-insulated vertically oriented segment to be installed within the well/borehole being also comprised of a ½ inch O.D. line.

Thus, for example, following the above-described preferred system design criteria, for a 3 ton DX system design capacity, which would utilize a total of 300 feet (100 feet per ton) of horizontally oriented line segments, the first portion/segment of the geothermal heat exchange, sub-surface, horizontally oriented, hot vapor line, with the refrigerant vapor being transported having exited the system's compressor in the cooling mode of operation, should be comprised of 100 feet of a ¾ (⁶⁄₈) inch O.D. line, with the next and second 100 foot horizontally oriented segment being comprised of a ⅝ inch O.D. line, with the next and third 100 foot horizontally oriented segment being comprised of a ½ inch O.D. line, and with the last and fourth 100 foot long vertically oriented looped segment (which segment has been looped via a U bend, or the like, at the bottom distal end of the well/borehole so as to provide a refrigerant transport loop of ½ inch O.D. line/tubing that is 100 feet long, which loop is comprised of two respective 100 feet deep ½ inch O.D. lines that are joined at their lower bottom distal ends by a U bend coupling, or the like) to be installed within a 100 foot deep (33.3% of the total combined horizontally oriented respective line segments) vertically oriented well/borehole being also comprised of a ½ inch O.D. line.

The sub-surface, un-insulated, geothermal heat transfer refrigerant tubing segments within the trench should preferably be situated at a depth that is at least two feet below the maximum frost line in the geographic area of installation, and should be kept at least ten apart, with a thirty foot horizontally oriented refrigerant segment separation being preferred.

Regarding the vertically oriented loop segment, comprising the final liquid transport line segment in the cooling mode, the loop segment should be situated within a vertically oriented well/borehole in a parallel line fashion with one of a U bend coupling and a U-bend at the bottom/lower distal end so as to expose any remaining vapor to the coolest possible, and most stable, sub-surface temperatures existing in the deepest line/tube segment. Additionally, at least 10%, and preferably 25%, of the top uppermost length of the one liquid refrigerant fluid transport line exiting, in the cooling mode, (as opposed to the parallel liquid line entering and traveling to the bottom of the well/borehole) the well/borehole loop segment should be insulated so as to inhibit any short-circuiting effects. The opposite liquid refrigerant fluid transport line entering the well/borehole loop segment should be either installed so that it enters the well/borehole at least two feet below the maximum frost line in the particular geographic location, or insulated in all areas within two feet of the maximum frost line in the geographic area of installation.

Further, while at least three preferred horizontally oriented decreasing line segments are described in the above example in the cooling mode, the decreasing line segments could alternatively be comprised of four, or more, horizontally oriented decreasing line size segments, as would be well understood by those skilled in the art. In such a system design, again using a three ton system capacity design for an example, a total of 300 feet (100 feet per ton) of horizontally oriented line segments would be preferred as a minimum. Thus, in a four horizontally oriented tubing segment design, the first portion of the geothermal heat exchange, sub-surface, horizontally oriented, hot vapor line, with the refrigerant vapor being transported having exited the system's compressor in the cooling mode of operation, should be comprised of 75 feet of a ⅞ inch O.D. line, with the next and second 75 foot horizontally oriented segment being comprised of a ⁶⁄₈ inch O.D. line, with the next and third 75 foot horizontally oriented segment being comprised of a ⅝ inch O.D. line, with the next and fourth 75 foot horizontally oriented segment being comprised of a ⁴⁄₈ inch O.D. line, and with the last and fifth 75 foot long vertically oriented looped segment (which has been looped via a U bend, or the like, at the bottom distal end so as to provide a refrigerant transport loop of ½ inch O.D. line/tubing that is 100 feet long, which loop is comprised of two 100 feet deep ½ inch O.D. lines that are joined at the lower bottom distal end by a U bend coupling, or the like) to be installed within a 100 foot deep (33.3% of the total combined horizontally oriented respective line segments) well/borehole being also comprised of a ½ inch O.D. refrigerant grade line/tube.

While, typically, only one sub-surface geothermal heat exchange line, comprised of decreasing line size segments in the cooling mode (which would be alternatively comprised of increasing line size segments in the heating mode, as is well understood by those skilled in the art), would be preferably utilized in such a combination horizontal trench/vertical well system design because it could be easily installed with only a trenching machine in a wide variety of locations, forms, and angles, the one line of decreasing segments could alternatively be comprised of multiple lines if desired, so as to spread the principal heat exchange area over a wider, but shorter, near surface area. For example, a horizontal array of multiple refrigerant transport tubing, as shown and described in U.S. Pat. No. 5,946,928 to Wiggs, or the like, could be utilized in lieu of the single, decreasing segment size (in the cooling mode), horizontally oriented, refrigerant transport line taught herein, with the final vertically oriented loop segment being operatively connected to the single liquid line exiting the sub-surface distributor which ultimately collects the refrigerant fluid from multiple horizontally oriented heat exchange lines in the cooling mode. Such a final vertically oriented loop segment would be designed with the same criteria as that for a single, decreasing segmental size in the cooling mode, horizontally oriented, line design, where the final vertically oriented liquid line loop segment is installed to a depth equaling at least 25%, and preferably 33.3%, of the total DX system's maximum design capacity in tons times 100 feet per ton.

Alternately, so as to avoid the expense of well/borehole drilling, a final single, horizontally oriented, liquid refrigerant transport line/tube could substituted for the vertically oriented loop at the end of the refrigerant path, in the cooling mode, in such a system principally comprised of multiple horizontally oriented sub-surface heat exchange lines. The advantage of adding such an additional final single, horizontally oriented, liquid refrigerant transport line/tube segment would be to expose the cooled refrigerant fluid to a totally virgin and relatively unstressed area of cooler land prior to entering the interior heat exchanger (in the cooling mode), which unstressed land area is not in a close proximity the primary heat exchange field, thereby increasing system operational efficiencies. In such a system design, the extra and final (in the cooling mode) horizontally oriented single liquid refrigerant transport line segment should preferably be installed in at least one of a horizontally oriented trench, a horizontally oriented pit, and a horizontally oriented excavated area so that the single line: is always at least 2 feet below the maximum frost line in the particular geographic location; is not within at least 10 feet, and preferably is not within 30 feet, of the primary multiple tube heat exchange field; and is not within at least 10 feet, and preferably is not within 30 feet, of any other portion of the single line segment itself. A minimum 10 foot buffer zone, and a preferred 30 foot buffer zone, helps to prevent any "short-circuiting" heat gain/loss effects within the refrigerant transport tubing. Also in such a system design, the final horizontally oriented loop segment would be designed with the same criteria as for a single, decreasing segment size in the cooling mode, horizontally oriented line design, where the final horizontally oriented liquid line loop segment is installed at a length equaling at least 25%, and preferably 33.3%, of the total footage distance obtained by multiplying the DX system's maximum design capacity in tons times 100 feet per ton.

Further, at least one of such a final horizontally oriented loop segment and a final vertically oriented loop segment, in the cooling mode, may be added at a desired length/depth in at least one of a horizontally oriented trench, a horizontally oriented pit, a horizontally oriented excavated area, and a vertically oriented well/borehole to increase the operational efficiency levels of existing DX systems of any design, as additional geothermal refrigerant transport tubing heat exchange exposure to less heat transfer stressed ground will increase system operational efficiencies. As is well understood by those skilled in the art, such a final horizontally oriented loop segment and/or such a final vertically oriented loop segment would respectively be initial segments in the heating mode of operation.

Additionally regarding insulation, all exterior sub-surface refrigerant transport lines/tubes within 2 feet of the maximum frost line in the geographic area of installation should be insulated; the liquid line exiting/entering a well/borehole (exiting in the cooling mode and entering in the heating mode) should be insulated at the top uppermost portion for at least a distance equal to 10%, and preferably to 25%, of the depth of the refrigerant transport line loop (loop depth) within the well/borehole; all single sub-surface refrigerant transport heat exchange tubes/lines should be kept at least 10 feet apart, and should preferably be kept at least 30 feet apart; and all refrigerant lines/tubes within at least 5 feet of a structure should be insulated. All insulation should preferably have at least a ½ inch thick wall and should be comprised of at least one of rubatex, neoprene, expanded polyethylene, or the like. Generally, the insulated portions of the sub-surface refrigerant transport tubing are not included in horizontally oriented segmental line size length calculations necessary for geothermal heat transfer. It is well understood by those skilled in the art that all exposed interior refrigerant transport lines should preferably be insulated.

Other customary direct expansion refrigerant system apparatus and materials would be utilized in a direct expansion system application, including at least one of a compressor, a receiver, a refrigerant expansion device, an accumulator, and an air-handler, for example, all of which are well-known to those skilled in the art, with various improvements having been previously taught by Wiggs, and are therefore not shown herein. Further, as the electrical components necessary to operate the system are well known by those skilled in the art, they are neither shown nor described herein.

BRIEF DESCRIPTION OF THE DRAWINGS

There are shown in the drawings embodiments of the invention as presently preferred. It should be understood, however, that since any number of horizontally oriented decreasing line segments in the cooling mode (increasing size line segments in the heating mode), could be utilized, the invention is not limited to the simple exemplary arrangements and instrumentalities shown in the drawings, wherein.

DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
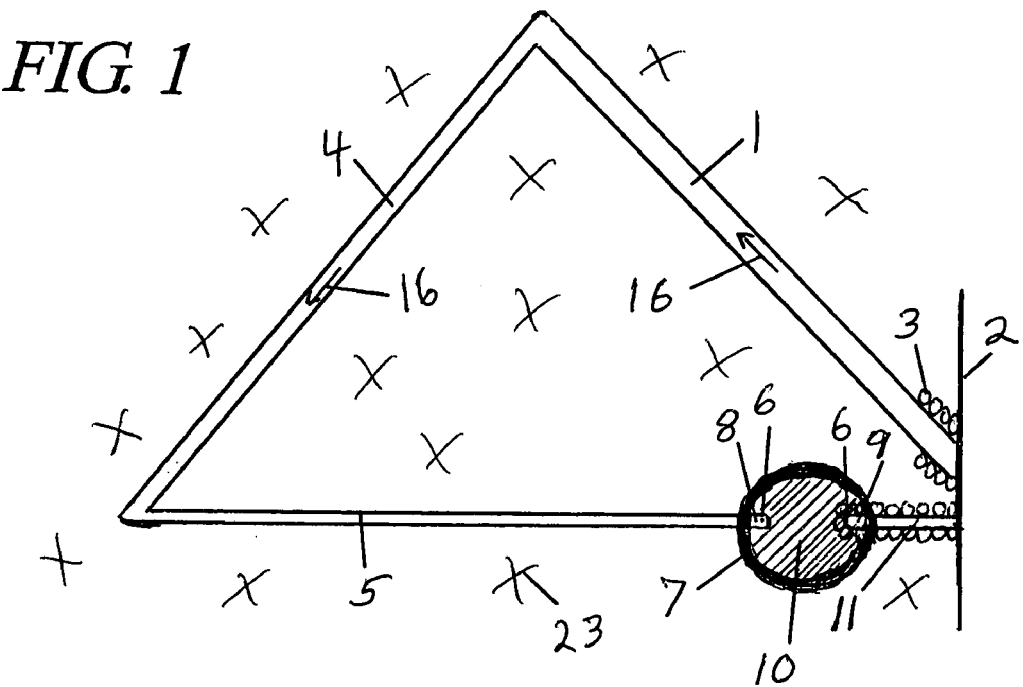
FIG. 1 is a top view of a single, decreasing size (when operating in the cooling mode), horizontally oriented, sub-surface, refrigerant fluid transport line/tube, with the final and smallest segment of the liquid refrigerant transport line entering and exiting a vertically oriented well/borehole that has been filled with a heat conductive grout.

Referring now to the drawings in detail, where like numerals refer to like parts or elements, there is shown in FIG. 1 a top view of a single, decreasing size (when operating in the cooling mode), horizontally oriented, sub-surface, refrigerant fluid transport line/tube, with four line/tubing size segments, 1,4,5, and 6. The first size line/tube segment 1, is the largest segment and is shown as exiting (in the cooling mode of system operation) a structure/building/home wall 2, and is surrounded by insulation 3 for at least a five foot distance (not drawn to scale) from the structural wall 2 so as to help prevent freezing damage to the wall 2 in the winter's heating mode of operation. The first size line/tube segment 1 extends for one-third (not drawn to exact scale) of the total un-insulated horizontally oriented, sub-surface, refrigerant transport line/tubing distance.

The second size line/tube segment 4 is preferably 1/8 inch smaller (not drawn to scale) than the first size line/tube segment 1, and extends for one-third (not drawn to exact scale) of the total un-insulated horizontally oriented, sub-surface, refrigerant transport line/tubing distance.

The third size line/tube segment 5 is preferably 1/8 inch smaller (not drawn to scale) than the second size line/tube segment 4, and extends for one-third (not drawn to exact scale) of the total un-insulated horizontally oriented, sub-surface, refrigerant transport line/tubing distance.

The fourth size line/tube segment 6 is preferably the same size as the third size line/tube segment 5, is primarily transporting a liquid form refrigerant fluid (not shown) in the cooling mode of system operation, and is shown as entering 8 and exiting 9 a vertically oriented well/borehole 7. After the fourth size line/tube segment 6 has been positioned within the well/borehole 7, the remaining interior of the well/borehole 7 has been filled with a heat conductive grout 10, such as grout 111 or the like, so as to eliminate insulating and poor heat conductive air gaps (not shown). All of the line/tube segments, 1,4,5, and 6, as well as the heat conductive grout 10 immediately surrounding the final segment 6 within the well/borehole 7, are situated within the ground 23, with all un-insulated heat transfer portions being at least two feet below the maximum frost line in the particular geographic location (not shown herein), but being well understood by those skilled in the art, and with all un-insulated heat transfer portions being at least 10 feet apart (not drawn to scale), and preferably at least 30 feet apart.

The portion of the fourth size line/tube segment 6 exiting 9 the well/borehole 7 is insulated 3 so as to prevent any heat transfer "short-circuiting" effect as it exits the well/borehole 7 in close proximity to the un-insulated, and warmer, portion of the fourth size line/tube segment 6 entering 8 the well/borehole 7. Further, since a maximum refrigerant cooling effect has been achieved via the refrigerant's flowing through the fourth size line/tube segment 6 within the well/borehole 7, the remaining portion of the liquid refrigerant transport line 11 between exiting 9 the well/borehole 7 and the structural wall 2 is insulated 3 so as to prevent any unwanted heat gain (in the cooling mode of system operation) as a result of near-surface atmospheric temperature influences. The direction of refrigerant (not shown) flow in the cooling mode is depicted by arrows 16 within the first and second refrigerant transport line/tubing segments, 1 and 4. As is well understood by those skilled in the art, the refrigerant fluid's direction of travel would be reversed in the heating mode. The refrigerant operational pressure, not shown, is at least 10% greater than produced by means of utilizing an R-22, or the like, refrigerant, which would be well understood by those skilled in the art, and is preferably an R-410A refrigerant.

Figure 2:
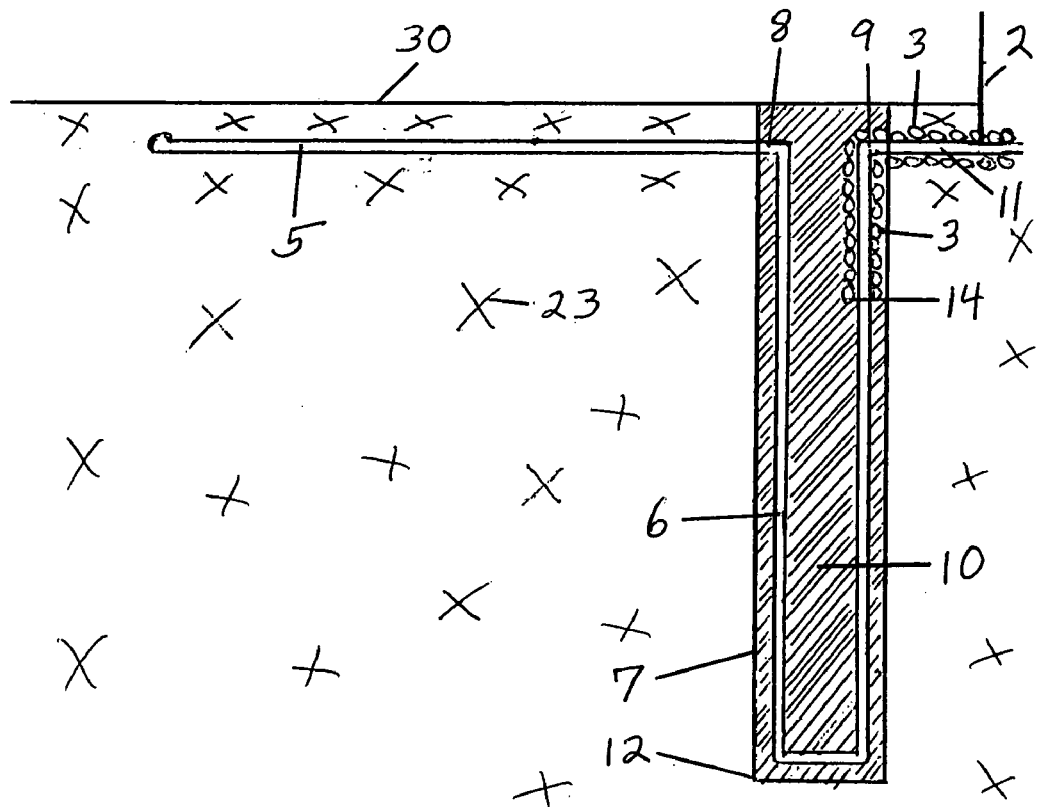
FIG. 2 is a side view of the refrigerant transport tubing shown in FIG. 1, with the final and smallest segment of the liquid refrigerant transport line entering the vertically oriented well/borehole, traveling to the bottom of the well/borehole (where it bends in a U-bend fashion), and exiting the well/borehole, which well/borehole has been filled with a heat conductive grout. The upper (top) 25% portion of the liquid refrigerant transport line exiting (in the cooling mode) the well/borehole has been insulated.

FIG. 2 is a side view of the refrigerant transport tubing shown in FIG. 1, as viewed from the side with the third and smallest size segment of the liquid refrigerant transport line/tube 5, including the fourth line/tube segment 6 within the well/borehole 7. The fourth line/tube segment 6 is shown entering 8 the vertically oriented well/borehole 7, traveling to a location near the bottom 12 of the well/borehole (where it bends in a U-bend fashion), and exiting 9 the well/borehole 7, which well/borehole 7 has been filled with a heat conductive grout 10.

While at least the uppermost 10% of the portion of the fourth size line/tube segment 6 exiting the well/borehole 7 (10% of the uppermost portion between the bottom 12 and the exiting 9 line at the top) should be fully insulated, the uppermost 25% (top) portion 14 (drawn approximately to scale) of the fourth size line/tube segment 6 exiting 9 (in the cooling mode) the well/borehole 7 (25% of the uppermost portion between the bottom 12 and the exiting 9 line at the top, which is a distance equal to about 25% of the well/borehole's vertical depth/loop depth) has been shown here as being insulated 3, which uppermost 25% is the preferred amount. As in FIG. 1, the remaining portion of the liquid refrigerant transport line 11 entering the structure wall 2 is insulated 3.

All of the line/tube segments, 5 and 6, shown, as well as the heat conductive grout 10 immediately surrounding the final segment 6 within the well/borehole 7, are situated within the ground 23, with all heat transfer portions being at least two feet below the maximum frost line below the ground's surface 30 in the particular geographic location (not shown herein), but being well understood by those skilled in the art.

Regarding the depth of the fourth size line/tube segment 6, which is comprised of a looped liquid refrigerant transport line in the cooling mode, while the fourth size line/tube segment 6 may extend to a depth equaling at least 25% of the entire and total horizontally oriented un-insulated line segments (1,4, and 5 in FIG. 1, which is incorporated herein by reference), the depth should preferably be at least 33.3%, as shown herein drawn approximately to scale, so that the depth of the fourth line/tube segment 6 equals the length of the third size line/tube segment 5. Such a minimum 25% and preferable 33.3% depth correlates, respectively, to 25% and 33.3% of the system's maximum tonnage design capacity (as is well understood by those skilled in the art) times 100 feet per ton.

Figure 3:
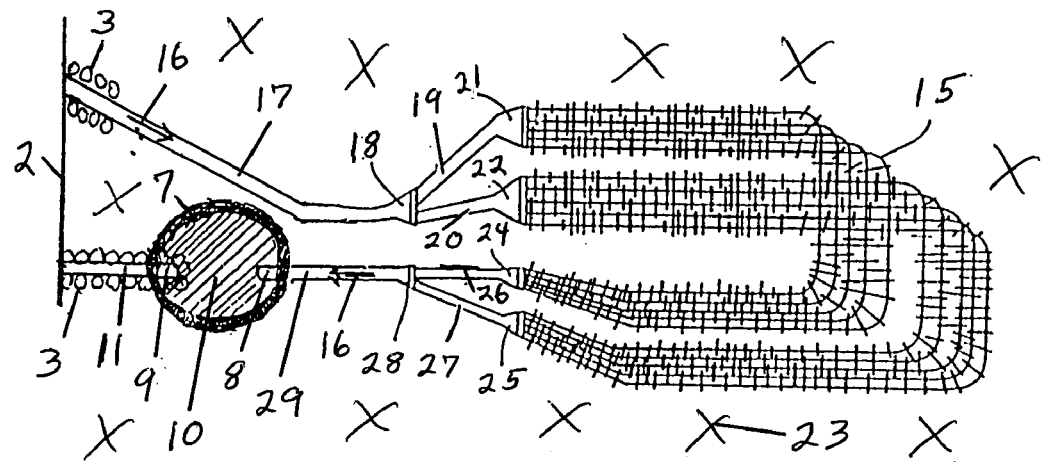
FIG. 3 is a top view of a horizontally oriented array of multiple geothermal heat exchange, finned, refrigerant transport tubing, with the final and single line segment (in the cooling mode) of the liquid refrigerant transport line entering and exiting a vertically oriented well/borehole that has been filled with a heat conductive grout.

FIG. 3 is a top view of a horizontally oriented array of multiple geothermal heat exchange, finned, refrigerant transport tubing 15. Although the array of multiple finned tubes 15 are shown here with finned tubing as an example, fins on the tubing are not necessarily a requisite.

A single hot gas vapor refrigerant transport line 17 (carrying refrigerant vapor exiting the system's compressor, not shown herein, in the cooling mode, as is well understood by those skilled in the art) is shown extending from a structural wall 2, and is surrounded by insulation 3 for at least five feet (not drawn to scale). The refrigerant fluid's (not shown herein) direction of travel in the cooling mode is indicated by arrows 16. As is well understood by those skilled in the art, the refrigerant fluid's direction of travel would be reversed in the heating mode.

The refrigerant fluid's hot gas vapor refrigerant transport line 17 is distributed by a refrigerant distributor 18 (a refrigerant distributor is well understood by those skilled in the art) into two respective hot gas vapor refrigerant transport lines, 19 and 20. Next, the hot gas vapor refrigerant fluid (not shown herein) travels through two respective refrigerant vapor distributors, 21 and 22, into the array of horizontally oriented finned tubing 15 where heat within the refrigerant is taken away by the surrounding ground 23. As the refrigerant is cooled by the ground 23, it cools and condenses into a liquid form (as is well understood by those skilled in the art) and then travels through two respective liquid refrigerant distributors, 24 and 25, into two respective liquid refrigerant transport lines, 26 and 27. The liquid refrigerant is then, via a single liquid refrigerant distributor 28, conveyed into a final and single liquid refrigerant transport line/tube 29 (in the cooling mode). The final and single liquid refrigerant transport line/tube 29 (in the cooling mode) is shown as entering 8 and exiting 9 a vertically oriented well/borehole 7 that has been filled with a heat conductive grout 10.

Similar to the heat transfer design as shown in FIG. 1 above, since a maximum refrigerant cooling effect will be achieved via the refrigerant's flowing through the final and single liquid refrigerant transport line/tube 29 mostly situated within the well/borehole 7, the remaining portion of the liquid refrigerant transport line 11 between exiting 9 the well/borehole 7 and the structural wall 2 is insulated 3 so as to prevent any unwanted heat gain (in the cooling mode of system operation) as a result of near-surface atmospheric temperature influences. The direction of refrigerant (not shown) flow in the cooling mode is depicted by arrows 16. The refrigerant operational pressure, not shown, is at least 10% greater than produced by means of utilizing an R-22, or the like, refrigerant, and is preferably an R-410A refrigerant.

Figure 4:
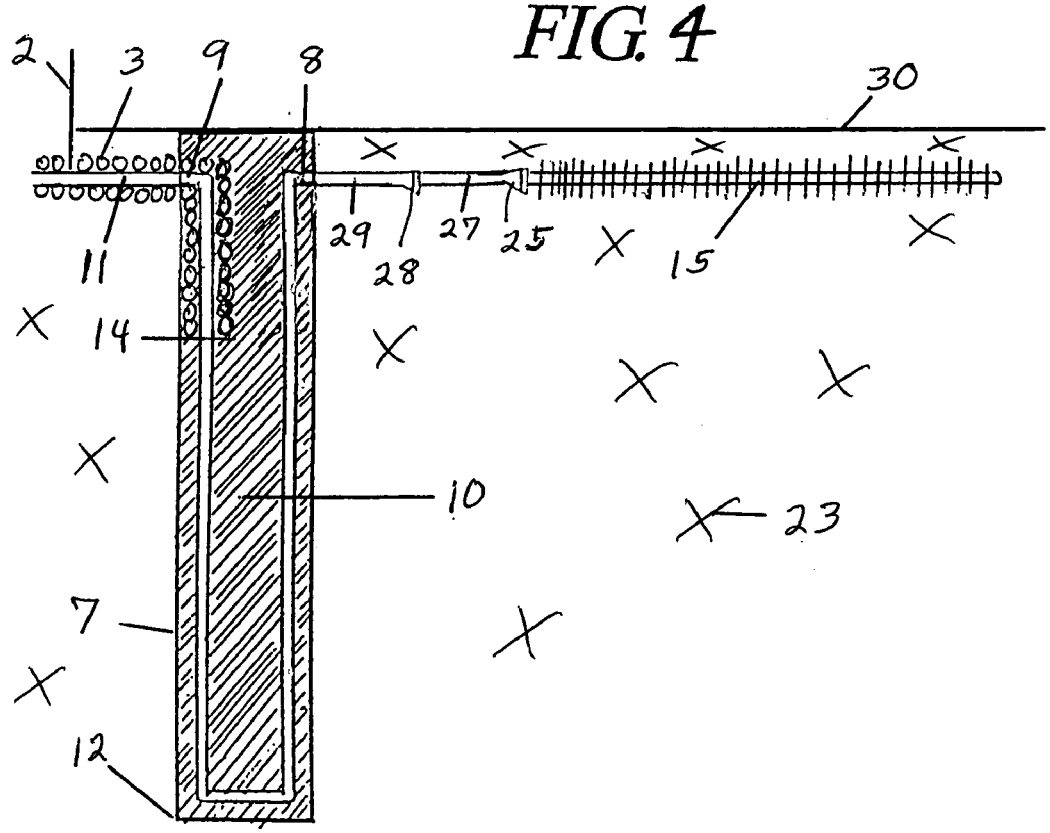
FIG. 4 is a side view of the refrigerant transport tubing shown in FIG. 3, with the final and single liquid refrigerant transport line segment (in the cooling mode) entering the vertically oriented well/borehole, traveling to the bottom of the well/borehole (where it bends in a U-bend fashion), and exiting the well/borehole, which well/borehole has been filled with a heat conductive grout. The upper (top) 25% portion of the liquid refrigerant transport line exiting (in the cooling mode) the well/borehole has been insulated.

FIG. 4 is a side view of the horizontally oriented array of multiple geothermal heat exchange, finned, refrigerant transport tubing 15 shown in FIG. 3, as viewed from the side with the well/borehole 7. After exiting the array of finned, refrigerant transport tubing 15, the refrigerant is shown as traveling through a liquid refrigerant distributor 25, into a liquid refrigerant transport line 27, into the single liquid refrigerant distributor 28, and into the final and single liquid refrigerant transport line/tube 29. The final and single liquid refrigerant transport line/tube 29 is shown entering 8 the vertically oriented well/borehole 7, traveling to a location near the bottom 12 of the well/borehole (where it bends in a U-bend fashion), and exiting 9 the well/borehole 7, which well/borehole 7 has been filled with a heat conductive grout 10.

While at least the uppermost (top) 10% of the portion of the final and single liquid refrigerant transport line/tube 29 exiting the well/borehole 7 (the uppermost 10% of the portion between the bottom 12 and the exiting 9 line at the top in the cooling mode) should be fully insulated, the uppermost 25% portion 14 (drawn approximately to scale) of the final and single liquid refrigerant transport line/tube 29 exiting 9 (in the cooling mode) the well/borehole 7 (25% of the uppermost portion between the bottom 12 and the exiting 9 line at the top in the cooling mode, which is equal to about 25% of the well/borehole depth/loop depth) has been shown here as being insulated 3, which is the preferred amount. As in FIG. 3, the remaining portion of the liquid refrigerant transport line 11 entering the structure wall 2 is insulated 3.

Regarding the depth of the final and single liquid refrigerant transport line/tube 29, which is comprised of a looped liquid refrigerant transport line in the cooling mode, while the final and single liquid refrigerant transport line/tube 29 may extend to a depth equaling at least 25% of the system's maximum tonnage design capacity (as is well understood by those skilled in the art) times 100 feet per ton, it would be preferable for the and single liquid refrigerant transport line/tube 29 to extend to a depth equaling at least 33.3% of the system's maximum tonnage design capacity times 100 feet per ton.

All of the geothermal heat transfer tubing, 15 and 29, shown, as well as the heat conductive grout 10 immediately surrounding the final and single liquid refrigerant transport line 29 within the well/borehole 7, are situated within the ground 23, with all heat transfer portions being at least two feet below the maximum frost line below the ground's surface 30 in the particular geographic location (not shown herein), but being well understood by those skilled in the art.

Figure 5:
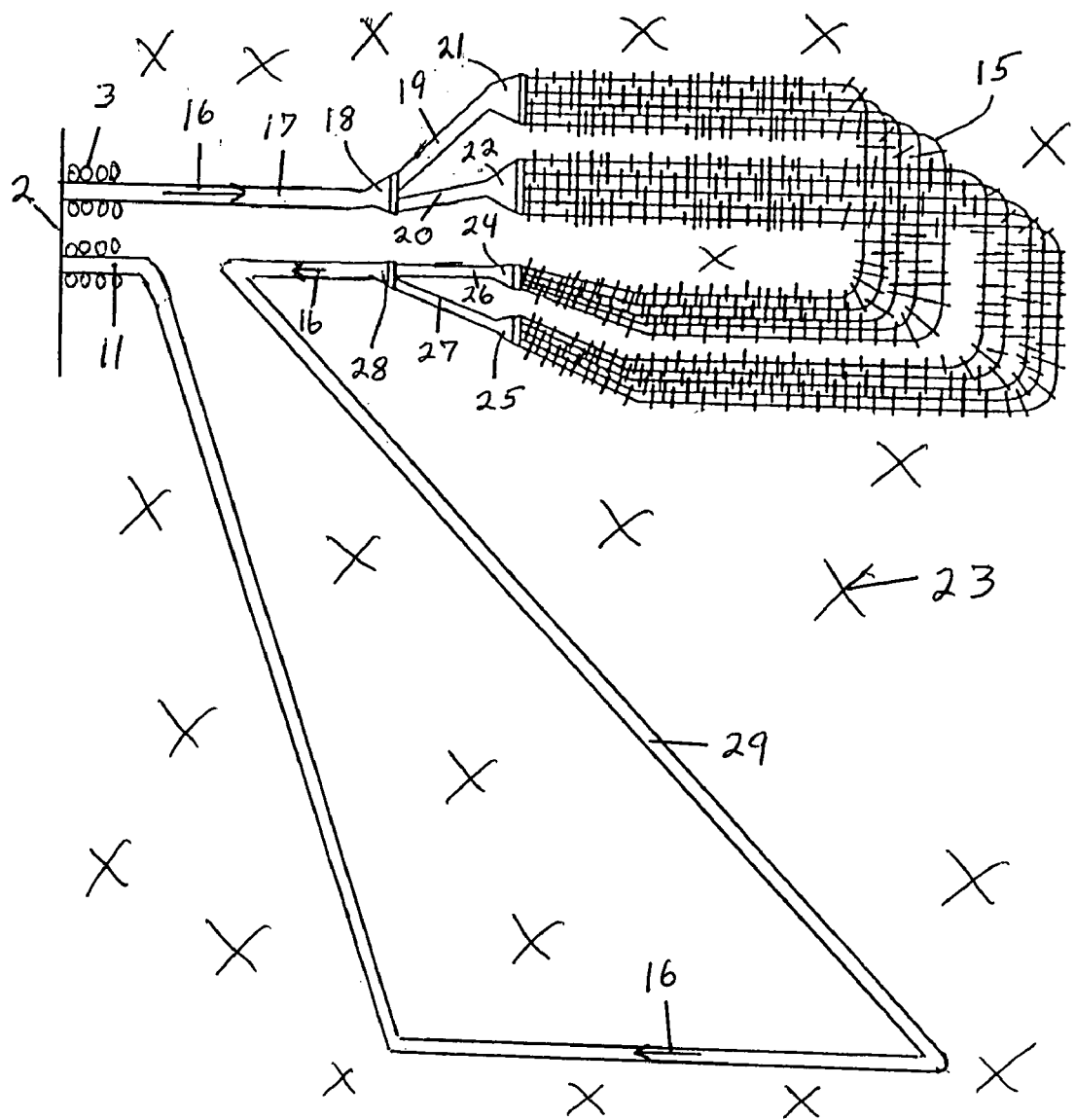
FIG. 5 is a top view of a horizontally oriented array of multiple geothermal heat exchange, finned, refrigerant transport tubing, with the final (in the cooling mode) and single line segment of the liquid refrigerant transport line comprised of a horizontally oriented single refrigerant transport line/tube.

FIG. 5 is a top view of a horizontally oriented array of multiple geothermal heat exchange, finned, refrigerant transport tubing 15. Although the array of multiple finned tubes 15 are shown here with finned tubing as an example, fins on the tubing are not necessarily a requisite.

A single hot gas vapor refrigerant transport line 17 (exiting the system's compressor, not shown herein, in the cooling mode, as is well understood by those skilled in the art) is shown extending from a structural wall 2, and is surrounded by insulation 3 for at least five feet (not drawn to scale). The refrigerant fluid's (not shown herein) direction of travel in the cooling mode is indicated by arrows 16. As is well understood by those skilled in the art, the refrigerant fluid's direction of travel would be reversed in the heating mode.

The refrigerant fluid's hot gas vapor refrigerant transport line 17 is distributed by a refrigerant distributor 18 (a refrigerant distributor is well understood by those skilled in the art) into two respective hot gas vapor refrigerant transport lines, 19 and 20. Next, the hot gas vapor refrigerant fluid (not shown herein) travels through two respective refrigerant vapor distributors, 21 and 22, into the array of horizontally oriented finned tubing 15 where heat within the refrigerant is taken away by the surrounding ground 23. As the refrigerant is cooled by the ground 23, it cools and condenses into a liquid form (as is well understood by those skilled in the art) and then travels through two respective liquid refrigerant distributors, 24 and 25, into two respective liquid refrigerant transport lines, 26 and 27. The liquid refrigerant is then, via a single liquid refrigerant distributor 28, conveyed into a final and single liquid refrigerant transport line/tube 29 (in the cooling mode). The final and single liquid refrigerant transport line/tube 29 (in the cooling mode) is shown here as being horizontally looped in a somewhat slanted triangular fashion, although the line/tube 29 could be installed within at least one of a trench and a pit, or the like, (not shown herein) in any shape, angle, or size.

While the final (in the cooling mode) and single, horizontally oriented, liquid refrigerant transport line/tube 29 may extend to a length equaling at least 25% of the system's maximum tonnage design capacity (as is well understood by those skilled in the art) times 100 feet per ton, it would be preferable for the final and single, horizontally oriented, liquid refrigerant transport line/tube 29 to extend to a length equaling at least 33.3% of the system's maximum tonnage design capacity times 100 feet per ton.

If such a final (in the cooling mode) single, horizontally oriented, liquid refrigerant transport line/tube 29 is added to supplement an existing DX system's sub-surface heat exchange area, an appropriate length may be added based upon the additional tonnage heat exchange desired multiplied by 100 feet per ton.

The final (in the cooling mode) and single liquid refrigerant transport line/tube 29 segment, being extended into and out of, in a loop, at least one of a horizontally oriented trench, a horizontally oriented pit, and a horizontally oriented excavated area, is positioned with the line/tube 29 being at least two feet (not drawn to scale) below the ground surface 30, and is extended in a manner so that the line/tube 29 is not within at least 5 feet, and preferably is not within 10 feet (not drawn to scale), of any other portion of the sub-surface heat transfer tubing, 17, 19, 20, 15, 26, 27, including the line/tube 29 loop itself, so as to avoid heat transfer inefficiencies.

Similar to the heat transfer design as shown in FIG. 3 above, since a maximum refrigerant cooling effect will be achieved via the refrigerant's flowing through the final and single liquid refrigerant transport line/tube 29 within the ground 23, the remaining portion of the liquid refrigerant transport line 11 within at least five feet (not drawn to scale) of the structural wall 2 is insulated 3 so as to prevent any unwanted heat gain (in the cooling mode of system operation) as a result of near-structural temperature influences. The direction of refrigerant (not shown) flow in the cooling mode is depicted by arrows 16. The refrigerant operational pressure, not shown, is at least 10% greater than produced by means of utilizing an R-22, or the like, refrigerant, and is preferably an R-410A refrigerant.

All portions of the final and single liquid refrigerant transport line/tube 29 within the ground 23, should preferably have all un-insulated heat transfer portions situated at least two feet below the maximum frost line in the particular geographic location (not shown herein), but being well understood by those skilled in the art, and should preferably have all un-insulated heat transfer portions of its loop situated at least 10 feet apart (not drawn to scale), and preferably at least 30 feet apart.

Figure 6:
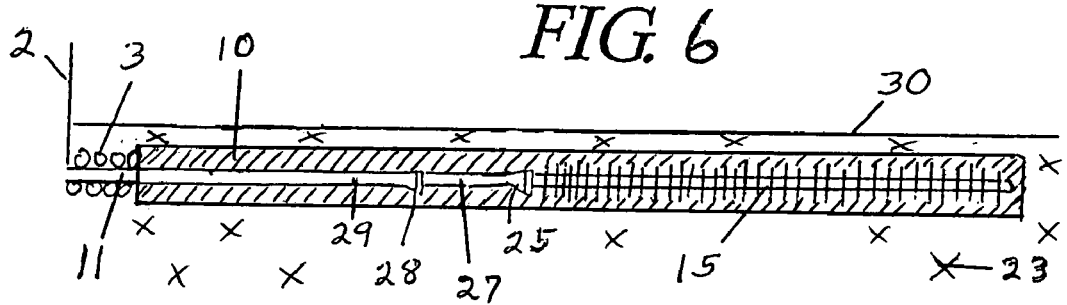
FIG. 6 is a side view of a horizontally oriented array of multiple geothermal heat exchange, finned, refrigerant transport tubing, with the final (in the cooling mode) and single line segment of the liquid refrigerant transport line comprised of a horizontally oriented single refrigerant transport line/tube, and with all the sub-surface heat transfer tubing surrounded by a solid grout material.

FIG. 6 is a side view of the horizontally oriented array of multiple geothermal heat exchange, finned, refrigerant transport tubing 15 shown in FIG. 5. After exiting the array of finned, refrigerant transport tubing 15, the refrigerant is shown as traveling through a liquid refrigerant distributor 25, into a liquid refrigerant transport line 27, into the single liquid refrigerant distributor 28, and into the final and single liquid refrigerant transport line/tube 29, with all of the geothermal heat transfer portions surrounded and encased by: a solid heat conductive grout 10 material, such as Grout 111 or the like, with such grout 10 having a preferable minimum ½ inch thick wall (not drawn to scale). Although the array of multiple finned tubes 15 are shown here with finned tubing as an example, fins on the tubing are not necessarily a requisite.

The solid heat conductive grout 10 is surrounded by the ground 23 below the ground surface 30. The insulated 3 segments of the sub-surface refrigerant transport tubing, such as the remaining portion of the liquid refrigerant transport line 11 within at least five feet of the structural wall 2, do not need to be surrounded by a solid grout for improved heat transfer efficiencies, as shown here, but should be surrounded (not shown herein) if the refrigerant transport line 11 is within a corrosive soil environment for protective purposes.

What is claimed is:

1. A direct expansion geothermal heat pump sub-surface, combination horizontally oriented and vertically oriented, refrigerant fluid transport tubing/line installation system comprising providing sub-surface, refrigerant transport, tubing/line segment that decreasing sizes when operating in the cooling mode and tubing/line segment that increasing sizes when operating in the heating mode, with the smallest segment size tubing/line extended into and out of, in a loop, a vertically oriented well/borehole; and
   wherein the smallest size tubing/line segment size extended into and out of a vertically oriented well/borehole, in a loop, has a loop that extends to a depth equal to at least 25% of the total combined lengths of all the horizontally oriented segments.

2. The geothermal heat exchange system of claim 1, wherein the decreasing tubing segment sizes are comprised of at least two sizes.

3. The geothermal heat exchange system of claim 2, wherein the decreasing tubing segment sizes are comprised of three sizes.

4. The geothermal heat exchange system of claim 3, wherein three decreasing tubing segment sizes, for a 1 ton up to, but not including, a 3 ton heating/cooling system design capacity, are respectively comprised of a ⅝ inch O.D. line/tube, a ½ inch O.D. line/tube, and a ⅜ inch O.D. line/tube.

5. The geothermal heat exchange system of claim 3, wherein three decreasing tubing segment sizes, for a 3 ton up to, and including, a 5 ton heating/cooling system design capacity, are respectively comprised of a ¾ inch O.D. line/tube, a ⅝ inch O.D. line/tube, and a ½ inch O.D. line/tube.

6. The geothermal heat exchange system of claim 2, wherein four decreasing tubing segment sizes, for a 1 ton up to, but not including, a 3 ton heating/cooling system design capacity, are respectively comprised of a ¾ inch O.D. line/tube, a ⅝ inch O.D. line/tube, a ½ inch O.D. line/tube, and a ⅜ inch O.D. line/tube.

7. The geothermal heat exchange system of claim 2, wherein four decreasing tubing segment sizes, for a 3 ton up to, and including, a 5 ton heating/cooling system design capacity, are respectively comprised of a ⅞ inch O.D. line/tube, a ¾ inch O.D. line/tube, a ⅝ inch O.D. line/tube, a ½ inch O.D. line/tube, and a ⅜ inch O.D. line/tube.

8. The geothermal heat exchange system of claim 1, wherein the smallest segment size tubing/line being extended into and out of a vertically oriented well/borehole, in a loop, has a loop that extends to a depth equal to 33.3% of the total combined lengths of all the horizontally oriented segments.

9. The geothermal heat exchange system of claim 1, wherein the lengths of the horizontally oriented sub-surface refrigerant transport tubing/line decreasing segment sizes all total a combined distance equal to at least 100 feet per ton of the system's maximum heating/cooling capacity design.

10. The geothermal heat exchange system of claim 8, wherein the respective lengths of the horizontally oriented sub-surface refrigerant transport tubing/line decreasing segment sizes are all respectively equal in distance.

11. The geothermal heat exchange system of claim 8, wherein the respective lengths of the horizontally oriented, sub-surface, refrigerant transport tubing/line decreasing segment sizes are all positioned at least two feet below the maximum frost line in the geographic area of installation and are all positioned at least 10 feet apart.

12. The geothermal heat exchange system of claim 11, wherein the respective lengths of the horizontally oriented, sub-surface, refrigerant transport tubing/line decreasing segment sizes are all positioned at least two feet below the maximum frost line in the geographic area of installation and are all positioned 30 feet apart.

13. The geothermal heat exchange system of claim 8, wherein the respective lengths of the horizontally oriented, sub-surface, heat transfer, refrigerant transport, tubing/line decreasing segment sizes are all surrounded by a solid heat conductive fill material.

14. The geothermal heat exchange system of claim 13, wherein the solid heat conductive fill material is Grout 111.

15. The geothermal heat exchange system of claim 1, wherein the horizontally oriented tubing/line segments include at least two decreasing tubing segment sizes.

16. A direct expansion geothermal heat pump sub-surface, combination horizontally oriented and vertically oriented, refrigerant fluid transport tubing/line installation system comprising providing sub-surface, refrigerant transport, decreasing tubing/line segment sizes when operating in the cooling mode and increasing tubing/line segment sizes when operating in the heating mode, with the smallest segment size tubing/line being extended into and out of, in a loop, a vertically oriented well/borehole;

wherein the smallest size tubing/line segment size being extended into and out of a vertically oriented well/borehole, in a loop, has a loop that extends to a depth equal to at least 25% of the total combined lengths of all the horizontally oriented segments; and wherein the uppermost portion of the smallest segment size refrigerant fluid transport line exiting the well/borehole in the cooling mode is insulated at its uppermost portion for a length equal to at least 10% of the loop depth.

17. The geothermal heat exchange system of claim 16, wherein the uppermost portion of the smallest segment size refrigerant fluid transport line exiting the well/borehole in the cooling mode is insulated at its uppermost portion for a length equal to 25% of the loop depth.

* * * * *